(12) United States Patent
Roberts

(10) Patent No.: US 8,242,180 B2
(45) Date of Patent: Aug. 14, 2012

(54) USE OF HIGH SATIETY, LOW CALORIE SOLID FOOD PRODUCT IN CONTROLLING BODY WEIGHT

(75) Inventor: Susan B. Roberts, Weston, MA (US)

(73) Assignee: Susan B. Roberts, LLC, Weston, MA (US)

( * ) Notice: Subject to any disclaimer, the term of this patent is extended or adjusted under 35 U.S.C. 154(b) by 927 days.

(21) Appl. No.: 12/288,420

(22) Filed: Oct. 20, 2008

(65) Prior Publication Data

US 2010/0098830 A1    Apr. 22, 2010

(51) Int. Cl.
*A23J 1/00* (2006.01)
(52) U.S. Cl. ............... 514/909; 426/656; 426/804
(58) Field of Classification Search .............. 426/656, 426/804; 514/909
See application file for complete search history.

(56) References Cited

U.S. PATENT DOCUMENTS 6,391,864 B1    5/2002  Stone ........................... 514/62
6,517,883 B1 *  2/2003  Herslof et al. ................ 426/602

FOREIGN PATENT DOCUMENTS

WO     2006/065738     6/2006

OTHER PUBLICATIONS

Halton et al. Journal of the American College of Nutrition, vol. 23, No. 5, pp. 373-385. 2004.*
Slavin et al. Nutrition Bulletin. No. 32. pp. 32-42. 2007.*
Merrill et al. Food Quality and Preference. vol. 15. pp. 859-870. 2004.*
Holt et al. European Journal of Clinical Nutrition. vol. 49. pp. 675-690. 1995.*
Fullness Factor—NutritionData.com (online); NutritionData know what you eat; "Understanding Hunger and Satiety" article 5-pages.
The Satiety Index (online); What Really Satisifies by David Mendosa. 20-Pages.
FiberGourmet: low calorie, high fiber pasta & crackers; online "Check Out Our Latest Creations!" Jun. 2009.
Ala Omega-3; Joseph's Tortillas (packaging); 2003.
Progresso Light Homestyle Vegetable and Rice Label; Jul. 21, 2008.

* cited by examiner

*Primary Examiner* — Anthony Weier
(74) *Attorney, Agent, or Firm* — Nields, Lemack & Frame, LLC

(57) ABSTRACT

Low sugar solid food product such as a cracker, chip, shelf-stable bread or crouton, that promotes satiety primarily as a result of its high fiber and protein content. The fiber plus protein content, expressed in grams, times n=kcal per portion, where n is from 5 to 10 gives a result from 1 to 3.

9 Claims, No Drawings

USE OF HIGH SATIETY, LOW CALORIE SOLID FOOD PRODUCT IN CONTROLLING BODY WEIGHT

BACKGROUND

Satiety, or a feeling of "fullness" in the absence of hunger, is an important factor in prevention of weight gain and achieving weight loss. If consumption of food products results in satiety, the consumer will be able to eat less and consume fewer calories. Some recent attention has been given to the characteristics of foods that result in a high level of satiety. For example, the Holt Satiety Index study rated different foods on their ability to satisfy hunger. The results of Holt's study indicate that satiety is related to the weight of the food consumed; the foods that weigh the most tend to be more satisfying independent of the number of calories they contain. Higher amounts of certain nutrients, such as protein and dietary fiber, also appear to improve satiety. Separate lines of research suggest that food form may also influence hunger and satiety, specifically, foods that are slowly digested on account of being more physically intact and therefore resistant to rapid digestion are more satisfying.

Commercially available bars and beverages often contain high protein, and sometimes also high fiber to attempt to promote high satiety with relatively few calories. Both bars and beverages have been rather common, perhaps due to their relative convenience, particularly for those who are too busy to consume regular meals. Typically these products contain about 50-150 calories (kcal) per portion. They often are composed of milk proteins and soluble fruit or vegetable pulp for fiber, and may include calcium, and cathetins to increase the metabolic rate.

Conventional wisdom suggests that once a person is satiated or "feels full", they will stop eating, which in turn will lead to weight loss or at least the absence or mitigation of weight gain. However, the composition of existing bars and beverages emphasizes only protein and soluble (rather than insoluble) fiber, which may not be optimal for long-term satiety. They are also typically sweet, having high sugar content or being sweetened with high amounts of artificial sweeteners to improve taste, and this may reduce the impact of high fiber and protein on satiety. It would be desirable to provide a low-sugar solid food product that has high insoluble fiber content, high protein content, and/or increases satiety throughout the day with incorporation of slowly digested food particles.

SUMMARY

The problems of the prior art have been overcome by the various embodiments disclosed herein, which include a solid food product that is not a sweet bar. In certain embodiments, the solid food product is a cracker, chip, shelf-stable bread or crouton. In certain embodiments, the solid food product is intended to be part of a main meal (not dessert) or snack and can be eaten alone or with other items. The solid food product promotes satiety primarily as a result of its insoluble fiber and protein contents. In certain embodiments, satiety is also promoted as a result of the food form (the inclusion of physically intact food particles that are satiating because they digested more slowly due to their physical intactness). In certain embodiments, the fiber plus protein content, express in grams, times n=kcal per portion, where n is from 5 to 10. In certain other embodiments, the fiber plus protein plus net carbohydrate in physically intact food particles, express in grams, times n=kcal per portion, when n is from 5 to 10.

In its method aspects, certain embodiments include controlling weight by consuming the solid food products disclosed herein, which induces satiety and concomitantly reduces the consumption of too much food. Certain embodiments include determining the protein and fiber and carbohydrate content from intact particles of a certain food, and based on such determination, calculating whether the food falls within a predetermined range, indicating it is a high satiety food.

DETAILED DESCRIPTION

In accordance with certain embodiments, the solid food product is a high satiety, low calorie, non-meat product, preferably a cracker or biscuit. The term "low calorie" as used herein means a caloric content per portion of between about 30 and about 120 calories, preferably less than about 100 calories per portion (1 food calorie=1 kilocalorie). A "portion" or serving size is generally a single cracker, or about 14 to 25 grams of solid food product. In certain embodiments, the solid food product includes fiber, preferably insoluble fiber, and protein, in amounts sufficient to satisfy the following Satiety Index 1:

Satiety Index 1=[(Protein $(g)$+Fiber $(g)$×$n$]/Calories wherein n is from 5 to 10, preferably 10, and the Satiety Index 1 is from about 1 to about 3.

In certain embodiments, the solid food product includes fiber, preferably insoluble fiber, protein, and net carbohydrate from physically intact unprocessed cereal grains in amounts sufficient to satisfy the following Satiety Index 2:

Satiety Index 2=[(Protein $(g)$+Fiber $(g)$+ Carbohydrate $(g)$]*$n$]/Calories wherein Carbohydrate* are carbohydrates from physically intact unprocessed cereal grains, and the Satiety Index 2 is from about 1 to about 3, and n is from 5 to 10, preferably 10.

Fiber is carbohydrate-containing food material that is not digested by the enzymes of the human gastrointestinal tract and, therefore has limited bioavailability to the body. Fiber is classified in different ways. 'Dietary' fiber refers to fiber contained in intact plants or plant products, and is distinct from 'functional' fiber which is isolated, purified fiber and also synthetically produced fiber. 'Insoluble' and 'soluble' descriptors are given to describe how dietary or functional fiber dissolves in water. An example of a source of insoluble fiber is wheat bran. An example of a soluble fiber is pectin, which is found in fruit. Insoluble fibers tend to be non-fermentable by colon bacteria versus soluble fibers which are typically fermentable. Sometimes fibers are therefore alternatively classified as fermentable and non-fermentable. On theoretical grounds the mechanisms by which insoluble/non-fermentable and soluble/fermentable fibers influence satiety are different. For example, insoluble fiber appears to influence satiety through its ability to increase luminal bulk from the stomach down to the colon, whereas soluble/fermentable fiber has transient effects on intestinal bulk in the stomach and may also influence secretion of gut hormones and increase fermentation in the colon (with concomittant absorption of the short chain fatty acids resulting from fermentation).

In certain embodiments, the solid food product has a brittle, crispy texture, breaking into multiple portions upon the application of minimal force. Preferably the solid food product is a cracker, biscuit, crouton, chip or shelf-stable bread, most preferably a cracker. Preferably the solid food product is consumed as part of a main meal (i. e. , breakfast, lunch and/or dinner), not as a dessert, or is consumed as a snack between meals either alone or with other foods.

Suitable sources of fiber in these products include insoluble cereal fiber, such as from wheat or corn. These fibers are of the insoluble cereal type, which may promote satiety better than soluble fibers from fruit and vegetable pulp, as insoluble fibers may have satiating effects all the way down the GI tract. Other fiber sources include rice bran and grain fibers (e. g., buckwheat, millet, etc.). Preferably the solid food product has a small or negligible soluble fiber content from such as fiber from fruit and vegetable pulp, and is devoid of "functional" fiber such as inulin, or contained in chicory root.

Suitable sources of slowly digested carbohydrates include whole kernels of wheat, barley, rye, oats and corn. Some of the protein content may come from the fiber source, and additional protein can be provided from egg white protein, for example. Other suitable sources of protein include milk proteins (e. g., casein and whey proteins), wheat gluten, and soy protein extract. Wheat gluten adds texture to the solid food product, e. g., providing crispiness to crackers.

The solid food product is preferably non-sweet, although a small amount of sweetener can be added to enhance the taste. The solid food product may contain some low calorie additional elements to improve taste such as non-absorbable fat and minerals, spices and herbs. It is preferably shelf-stable and does not require refrigeration.

The satiety promoted by the solid food product is believed to be a result of the fiber content, the protein content, and the form of the food product (e. g., physically intact particles that are satiating because they digest more slowly than other food product forms due to their physical intactness). Preferably the solid food product is consumed at least daily, thereby increasing satiety not only for the time of the meal and immediately thereafter, but also providing a generalized level of satiety throughout the day. The product is safe to consume multiple times each day—i. e. with each meal and snack if desired.

The various indices disclosed herein can be used to determine the satiety of commercially available products. For example, by reading the nutritional label, the amount of protein and fiber, in grams, can be summed, multiplied by a factor of 10, and the result can be divided by the amount of calories (e. g., in a serving size) to determine if Satiety Index 1 is satisfied.

EXAMPLE 1

Crackers were made using the following ingredients in the amounts specified:
1 cup water
1 cup coarse wheat bran
¼ cup corn bran
¼ tsp salt
1 tsp honey
1 tsp wheat gluten (available in whole food stores)
2 large egg whites
0. 5 tsp oil
Spray oil The water was heated to nearly boiling, and mixed with the wheat and corn brans. The mix was allowed to stand for a couple of minutes while the water soaked into the bran, then the salt and honey were added and mixed well. The egg whites were added and mixed, followed by the addition of the gluten and oil and further mixing.

A 10×15 inch baking tray was sprayed with non-stick spray oil, making sure to not leave any dry spots to prevent the crackers from sticking to the tray. The mixture was spread evenly over the tray.

The mix was then baked at 250-300° F. for 90-120 minutes until the crackers were entirely crisp but only lightly browned. The crackers can be flipped over after 1 hour to speed up the baking if desired.

The crackers were removed from the pan immediately when cooked to prevent sticking, and broken into uneven chunks (they will not break evenly, or if even breaking is desired they can be cut while partly cooked and not completely dry) and stored in an airtight plastic bag until use.
Makes 5 servings of approximately 6 crackers 2"×2. 5"
Nutritional content 1 serving plain crackers (⅕ recipe)
Calories 54
Protein 4. 0 grams
Total fat 1. 5 grams
Saturated fat 0. 1 grams
Total carbohydrate 13. 6 grams
Fiber 9. 0 grams
Satiety Index 1=2. 41 (when n=10)
(Carbohydrates are not counted in this index as this is not the slowly digested carbohydrates from whole intact grains)

EXAMPLE 2

The procedure of Example 1 was carried out, except that the gluten was reduced to ½ tsp, no oil was added, and 4 tsp of whole raw flax seeds were added. The seeds are spread evenly over the mixture once it is placed on the tray.
Nutritional content 1 serving seeded crackers (⅕ recipe):
Calories 63
Protein 4. 2 grams
Total fat 1. 6 grams
Saturated fat 0. 2 grams
Total carbohydrate 14. 3 grams
Fiber 9. 5 grams
Satiety Index 1=2. 17 (when n=10)

EXAMPLE 3

Nacho Chips Variation:
To the plain cracker recipe add 2 tsp Nacho powder or other chip seasoning of choice (for example, available from www.spicesetc. com). The method of Example 1 was then used to form nacho chips.

What is claimed is:

1. A method of controlling body weight, comprising determining the satiety of a solid food product, comprising determining the sum of the amount of grams of protein and fiber in said solid food product, multiplying said sum by a factor of from 5 to 10, dividing the result of said multiplication by the amount of calories in said product, determining whether the result of said division is from 1 to 3, and if said result of said division is from 1 to 3, consuming said solid food product.

2. The method of claim 1, wherein said factor is 10.

3. The method of claim 1, wherein said solid food product is selected from the group consisting of a cracker, a biscuit, a chip, shelf-stable bread or a crouton.

4. The method of claim 1, wherein said consuming step is as part of a main meal.

5. The method of claim 1, wherein said consuming step is as a snack between meals.

6. The method of claim 1, wherein said solid food product includes insoluble fiber.

7. The method of claim 6, wherein said insoluble fiber comprises cereal.

8. The method of claim 6, wherein said insoluble fiber comprises wheat bran.

9. The method of claim 1, wherein said protein in said solid food product is selected from the group consisting of egg white protein, milk protein, wheat gluten, and soy protein extract.

* * * * *